J. HALL.
Car Starter.
No. 35,020.
Patented Apr. 22, 1862.
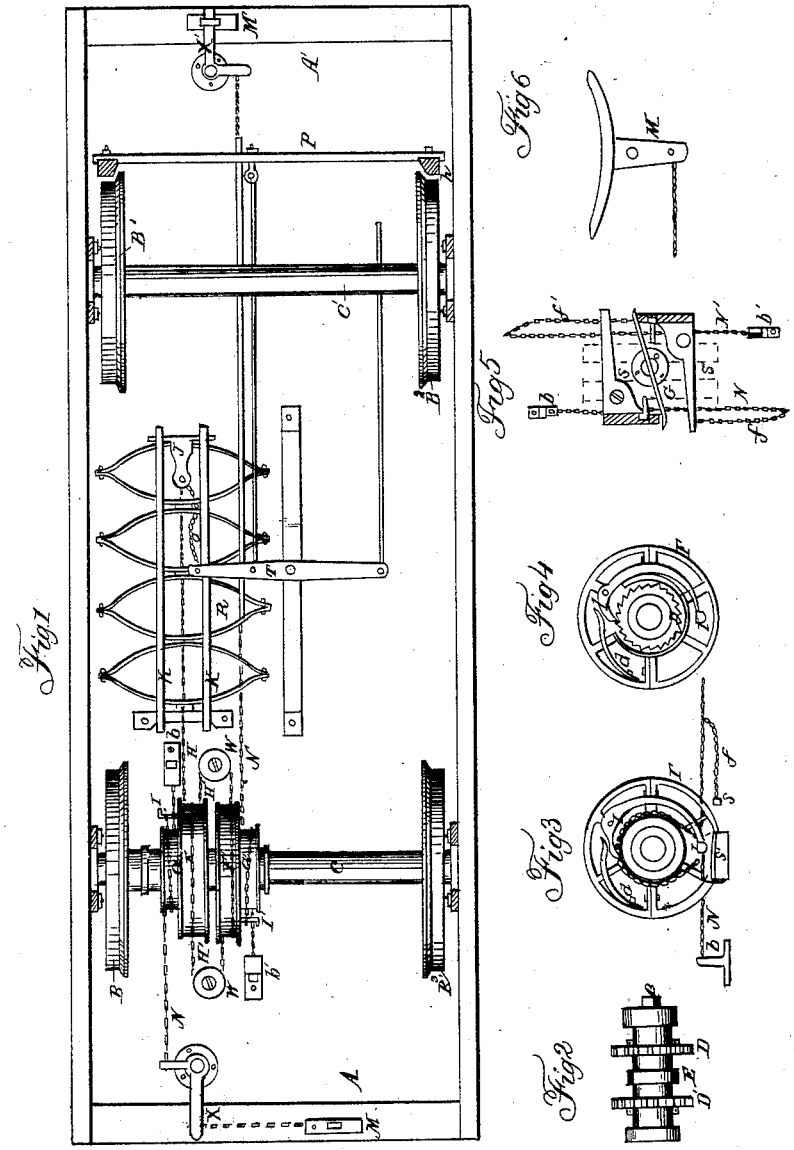

UNITED STATES PATENT OFFICE.

JEREMIAH HALL, OF GRANVILLE, OHIO.

IMPROVEMENT IN REACTION CAR-BRAKES.

Specification forming part of Letters Patent No. 35,020, dated April 22, 1862.

*To all whom it may concern:*

Be it known that I, JEREMIAH HALL, of Granville, in the county of Licking and State of Ohio, have invented a new and useful Machine for the Purpose of Aiding in Stopping and Starting Railroad-Cars and other Vehicles or Machinery, and designated as a "Reaction Car-Brake;" and I do hereby declare that the following is a full, clear, and exact description of the construction and operation of the same, reference being had to the accompanying drawings, and to the letters of reference marked thereon.

The drawings consist of six figures. Figure 1 represents the bed and wheels of a street-railroad car in an inverted position, to which my reaction-brake is attached. Figs. 2 and 5 are horizontal sections, and Figs. 3, 4, and 6 are vertical sections, all of which are referred to by their letters in these specifications.

As shown in Fig. 2, a cast-iron sleeve, E, divided longitudinally into two segments, that it may be applied to cars already made, is placed upon the axle C, and the two segments are bolted together and made rigidly fast to the axle. To aid in making it fast, the tenon $e$ enters into a slot cut in the wheel B. Two ratchet-wheels, D D', are cast upon the sleeve, with the teeth on each ratchet-wheel inclining in an opposite direction to those of the other.

As shown in Figs. 1, 3, and 4, two drum-wheels, F and F', having each a hollow hub, $a\ a'$, are each cast in two equal segments, that they may be applied to cars already made, and are placed upon the sleeve E in such position that the hubs envelop the ratchet-wheels, and the two segments of each drum-wheel are bolted together through adjacent arms, and are banded with wrought-iron around the end of the hubs.

One or more pairs of elliptic steel springs are bolted together back to back, so as all to act as one spring, R, and, thus combined, are placed across and under the bed of the car and rest upon two rods, K K, which, placed lengthwise of the car, are fastened to its bed. The side of the springs R next to the axle C is made fast to the bed of the car, and a hook, J, is made fast to the other side of the springs.

A chain, H, is made fast at one end to the hook J and at the other end to the upper side of the periphery of the wheel F. The chain H' is made fast at one end to the upper side of the periphery of the wheel F, and, passing around the wheel F, it is then carried around the pulley W and made fast at the other end to the upper side of the periphery of the wheel F'. The chain $H^2$ is made fast at one end to the upper side of the periphery of the wheel F', and, passing around the wheel F', it is carried around the pulley W' and made fast at the other end to the upper side of the periphery of the wheel F, thus combining the wheels F and F', so that when either of them is made to revolve it always produces an opposite revolution of the other.

A pawl, I, is attached by a bolt to one side of the wheel F, and in like manner a pawl, I', is attached to the side of the wheel F', and the grappling end of each pawl passes through an aperture in the hub of the wheel to which it is attached and works in the ratchet-wheel within the hub. The other arm of each pawl is bent near the end perpendicular to the side of the wheel and parallel to the surface of the hub, and has a flange on its end.

A spring, $d$, is made fast at one end to the side of the wheel F, and the other end presses against the grappling end of the pawl I in direction and force sufficient to press that end of the pawl into connection with the ratchet-wheel D, and in the same manner and for the same purpose a like spring is attached to the wheel F'.

A chain, N, made fast at one end to a brace, $b$, under the bed of the car, is passed around the hub of the wheel F, encircling both the hub and the arm of the pawl I, and at the other end it is made fast to the quadrant X, and in like manner another chain, N', passing around the hub of the wheel F' and the arm of the pawl I', is made fast at one end to the brace $b'$ and at the other end to the quadrant X'. The quadrant X (and X') is in the form of a right angle, and is movable on a pivot which passes through it near its vertex and fastens it to the under side of the bed of the car.

The treadle M, as shown in Fig. 6, turns on a pivot through its lower arm, which passes down through the bed of the platform of the car and is connected with the quadrant X, so that they move together. By means of the treadle M or its equivalent the chain N is tightened or relaxed at pleasure. In like manner the treadle M' or its equivalent is employed to tighten or relax the chain N' at the other end of the car.

Two stops, S S', as shown in Fig. 5, each in the form of a right angle, are each movable horizontally on a pivot which fastens them to the under side of the car-bed. One arm of S is placed directly over the end of the hub $a$ of the wheel F and made of sufficient depth to depress the arm of the pawl I whenever the arm of that pawl is brought directly over the axle and the stop is in place; but it is thrown out of place by the spring G whenever the chain N', to which its other arm is attached by means of the chain $f'$, is relaxed, and is again brought into place whenever the chain N' is tightened. In like manner by tightening the chain N the other stop, S', is moved into place to depress the arm of the pawl I', and is again thrown out of place by the spring G whenever the chain N is relaxed.

A chain, O, is made fast at one end to the hook J and at the other end to the lever T of the common friction-brake P, thus combining this reaction car-brake with the common friction car-brake, as shown by the drawings. The drawings sufficiently describe the pulleys W W'.

The principles upon which this reaction car-brake operates may be further explained as follows:

Let the end A of the car be used as the forward end and the car be moving forward unimpeded. Then press upon the right arm of the treadle M, and its depression relaxes the chain N, and the spring $d$ forces the grappling end of the pawl I into contact with the teeth of the ratchet-wheel D. The continued revolution of the ratchet-wheels brings the teeth on the ratchet-wheel D against the end of the pawl I and causes the wheel F, to which the pawl is attached, to revolve with the axle C, and this revolution of the wheel F winds one end of the chain H and one end of the chain $H^2$ upon the wheel F, and the winding of one end of the chain $H^2$ upon the wheel F causes the wheel F' to revolve in the opposite direction and to wind the chain H' upon the wheel F', and the winding of one end of the chain H upon the wheel F causes the side of the springs R to which the hook J is attached to be drawn toward the side which is made fast to the bed of the car, and the resistance of the springs R tends to stop the car; but in case the momentum of the car is sufficient wholly to compress the springs R the chain O draws upon the lever T of the common friction car-brake P and presses its rubbers $h$ $h$ upon the car-wheels, so as to aid in stopping the car and prevent too great strain upon the springs and other machinery.

Let it now be required to start the car. By pressing upon the left arm of the treadle M, the chain N, which encompasses the hub of the wheel F and the arm of the pawl I, is tightened, thus compressing the arm toward the hub and lifting the grappling end of the pawl out of the ratchet-wheel. The reaction of the springs R draws back the chain H, unwinding the chains H and $H^2$ from the wheel F and the chain H' from the wheel F', and again winding the chain H' upon the wheel F and the chain $H^2$ upon the wheel F', and causing the wheel F' to revolve in the same direction in which the axle C had been revolving before the car was stopped, thus causing the pawl I' to grapple the teeth of the ratchet-wheel D' and the axle C to revolve with it, and thus starting the car. Since whenever the chain N is tightened the stop S' is drawn by it into place, and since whenever the springs R are fully relaxed the arm of the pawl I' is brought directly over the axle C, the arm of that pawl is depressed by the stop S' and its grappling end is lifted out of the ratchet, so that the car moves on without being impeded by either pawl. Let now the end A' of the car be used as the forward end, and the same method of working this reaction-brake will be followed by the same results, thus rendering the same brake equally efficient when the car runs in either direction.

What I claim as my invention, and desire to secure by Letters Patent, is—

1. The combination, with a railroad-car axle, of the sleeve E, the ratchet-wheels D D', and the drum-wheels F F', and pawls I I', substantially as described.

2. The combination of the springs R with the drum-wheels F F', the pulleys W W', and chains H H' $H^2$, substantially as described.

3. The combination of the treadle or foot lever M M', levers X X' and their connecting-chain and rod, in combination with the stops S S', and for the purpose as herein substantially described.

4. The combination of the reaction car-brake, as above claimed, with the friction car-brake P and chain O, as herein described.

JEREMIAH HALL.

Witnesses:
W. A. STEVENS,
GEO. E. STEVENS.